(12) United States Patent
Shikatani

(10) Patent No.: US 7,423,793 B2
(45) Date of Patent: Sep. 9, 2008

(54) METHOD AND APPARATUS FOR DECODING DIGITAL SIGNAL

(75) Inventor: Motokazu Shikatani, Koganei (JP)

(73) Assignee: National Institute of Information and Communication Technology, Tokyo (JP)

( * ) Notice: Subject to any disclaimer, the term of this patent is extended or adjusted under 35 U.S.C. 154(b) by 880 days.

(21) Appl. No.: 10/684,548

(22) Filed: Oct. 15, 2003

(65) Prior Publication Data

US 2004/0175184 A1   Sep. 9, 2004

(30) Foreign Application Priority Data

Oct. 15, 2002   (JP)   ............................. 2002-300066

(51) Int. Cl.
    *G06E 3/00*   (2006.01)
(52) U.S. Cl. ....................... 359/107; 382/212; 714/752; 714/759; 714/777
(58) Field of Classification Search ......... 382/232–253, 382/212–214; 714/746–797; 359/559–561, 359/107; 385/14
    See application file for complete search history.

(56) References Cited

U.S. PATENT DOCUMENTS

| 3,125,683 | A | * | 3/1964 | Stewert et al. | ......... | 250/227.11 |
| 4,995,090 | A | * | 2/1991 | Singh et al. | .................. | 382/213 |
| 5,129,058 | A | * | 7/1992 | Mifune et al. | ................ | 345/501 |

(Continued)

FOREIGN PATENT DOCUMENTS

| JP | 8-129149 | 5/1996 |
| JP | 2000-216681 | 8/2000 |
| JP | 2001-251244 | 9/2001 |

OTHER PUBLICATIONS

Junpei Tsujiuchi, et al., "Optical Information Processing", Dec. 1, 1982, pp. 106-109, (with English translation).

(Continued)

*Primary Examiner*—Bhavesh Mehta
*Assistant Examiner*—Sean Motsinger
(74) *Attorney, Agent, or Firm*—Oblon, Spivak, McClelland, Maier & Neustadt, P.C.

(57) ABSTRACT

A method for decoding a digital signal includes receiving a multiple-bit digital signal that includes information to be transmitted; arraying bit strings of the received multiple-bit digital signal to thereby generate a received signal image as a two-dimensional image; arraying all types of predetermined proper signals used for signals transmitted and bit strings of patterns including errors each derived from each proper signal to thereby generate a different two-dimensional image and disposing a set of received signal patterns, each comprised of an arbitrary proper signal and a group of two-dimensional images of patterns having the arbitrary proper signal added with an error, in a state that enables identification of each proper signal to thereby generate a received signal pattern image; using optical signal processing to evaluate a coefficient of correlation between the received signal image and the received signal pattern image to thereby obtain a correlation projection image in which depth and brightness intensity distribution is proportional to the coefficient of correlation; extrapolating transmitted proper signals from a region that includes a maximum point of the depth and brightness intensity distribution appearing in the correlation projection image based on a correspondence between the region and the set of received signal patterns in the received signal pattern image; and identifying transmitted information from the extrapolated proper signals.

36 Claims, 13 Drawing Sheets

U.S. PATENT DOCUMENTS

| | | | | |
|---|---|---|---|---|
| 5,668,647 | A | * | 9/1997 | Nuss .............................. 359/4 |
| 5,838,650 | A | * | 11/1998 | Campbell et al. ........... 369/103 |
| 5,920,536 | A | * | 7/1999 | Campbell et al. ........... 369/103 |
| 6,038,073 | A | * | 3/2000 | Ono ........................... 359/561 |
| 6,160,656 | A | * | 12/2000 | Mossberg et al. ........... 359/328 |
| 6,216,267 | B1 | | 4/2001 | Mitchell |
| 6,275,311 | B1 | * | 8/2001 | Boffi et al. .................. 359/107 |
| 6,313,932 | B1 | * | 11/2001 | Roberts et al. ................. 398/9 |
| 7,130,292 | B2 | * | 10/2006 | Turpin et al. ................ 370/342 |

OTHER PUBLICATIONS

Eung Gi Paek, et al., "VanderLugt Correlator and Neural Networks", Proc. IEEE Internat. Conference on Systems, Man and Cybernetics, XP-010091474, Nov. 14, 1989, pp. 408-414.

A. Vander Lugt, "Signal Detection By Complex Spatial Filtering", IEEE Transactions on Information Theory, XP-001184740, vol. 10, Apr. 1964, pp. 139-145.

Takumi Minemoto, et al., "Implementation of image processing algorithms and modified signed-digit addition on a hybrid optical computing system", Optical Computing and Processing, XP-000387737, vol. 3, No. 1 1993, pp. 39-52.

Lingfeng Yu, et al., "Parameterized multi-dimensional data encryption by digital optics", Optics Communications, XP-004343746, vol. 203, No. 1-2, Mar. 1, 2002, pp. 67-77.

Feng Lin Zhang, "Image processing using hybrid systems and it's applications", Porc., IEEE Conference on Systems, XP-010249411, Oct. 12, 1997, pp. 2995-3000.

J. Tsujiuchi, et al. Asakura Co., pp. 106-107, "Optical Signal Processing Principles". (with English translation).

* cited by examiner

FIG. 1

| Set (Information) | a(001) | b(010) | c(011) | d(100) | e(101) | f(110) | g(111) |
|---|---|---|---|---|---|---|---|
| Transmission word | 001110 | 010101 | 011011 | 100011 | 101101 | 110110 | 111000 |
| Received signal patterns / Error patterns | 101110 | 110101 | 111011 | 000011 | 001101 | 010110 | 011000 |
| | 011110 | 000101 | 001011 | 110011 | 111101 | 100110 | 101000 |
| | 000110 | 011101 | 010011 | 101011 | 100101 | 111110 | 110000 |
| | 001010 | 010001 | 011111 | 100111 | 101001 | 110010 | 111100 |
| | 001100 | 010111 | 011001 | 100001 | 101111 | 110100 | 111010 |
| | 001111 | 010100 | 011010 | 100010 | 101100 | 110111 | 111001 |
| | 101010 | 110001 | 111111 | 000111 | 001001 | 010010 | 011100 |

FIG. 8

|   | a | b | c |
|---|---|---|---|
|   | GXZ | R X K | RG ZK |
|   | W GXZ | WR X K | WRG ZK |
|   | RGXZ | X K | G ZK |
|   | XZ | RGX K | R ZK |
|   | G Z | R K | RGXZK |
|   | GX | R XZK | RG K |
|   | GXZK | R X | RG Z |
|   | W G Z | WR K | WRGXZK |

| d | e | f | g |
|---|---|---|---|
| W ZK | W GX K | WR XZ | WRG |
| ZK | GX K | R XZ | RG |
| WR ZK | WRGX K | W XZ | W G |
| W G ZK | W X K | WRGXZ | WR |
| W XZK | W G K | WR Z | WRGX |
| W K | W GXZK | WR X | WRG Z |
| W Z | W GX | WR XZK | WRG K |
| XZK | G K | R ZK | RGX |

F I G. 1 2
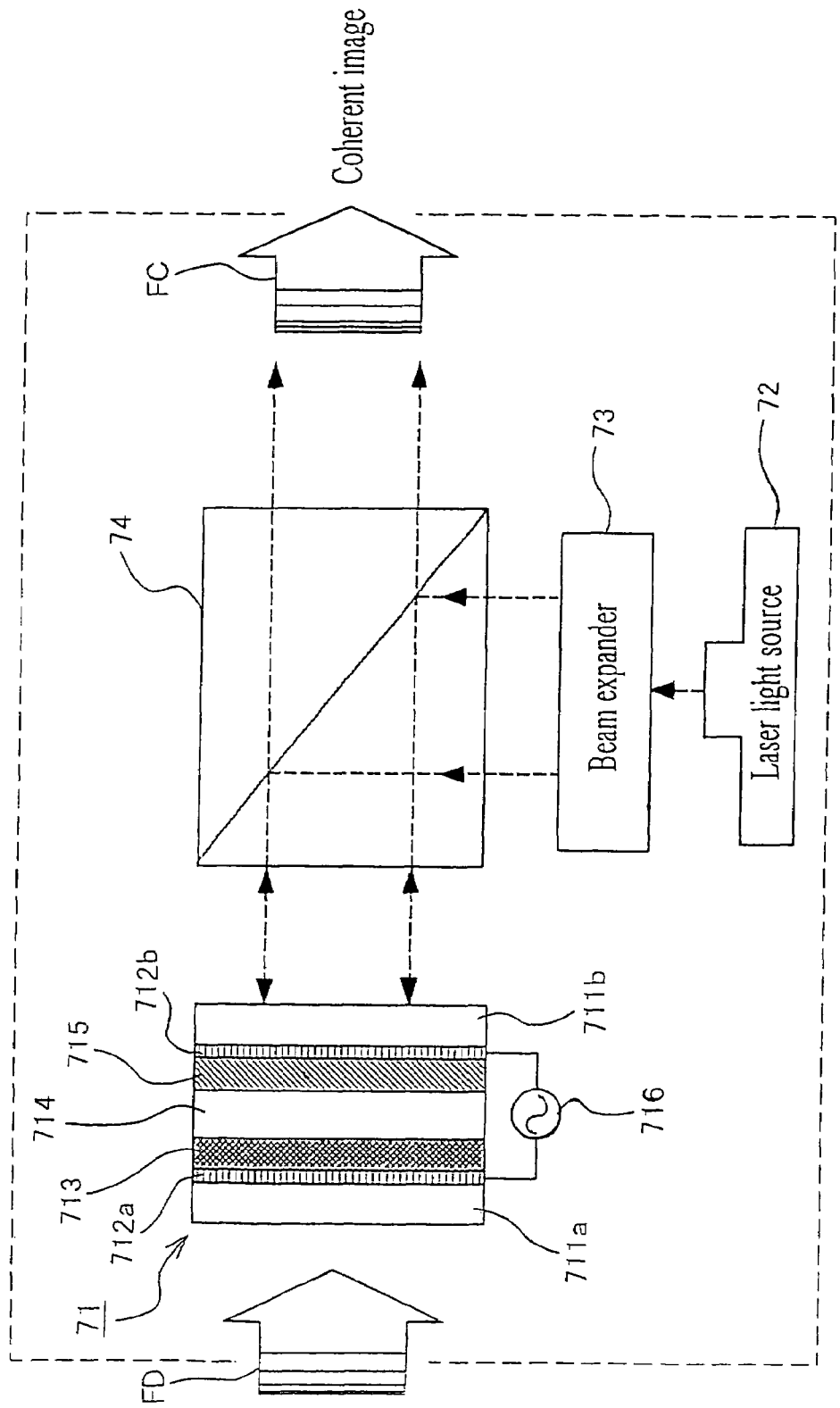

F I G. 14
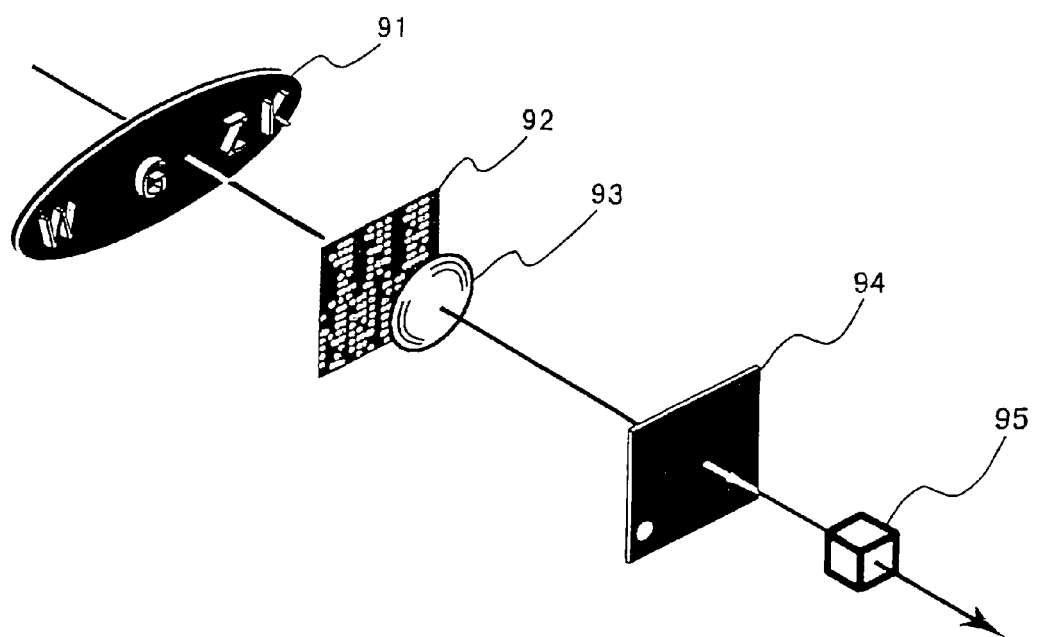

METHOD AND APPARATUS FOR DECODING DIGITAL SIGNAL

BACKGROUND OF THE INVENTION

1. Field of the Invention

The present invention relates to a method and apparatus for decoding a digital signal that has been error-correction encoded. More particularly, it relates to high-speed decoding of digital signals that have been encoded using optical signal processing technology.

2. Description of the Prior Art

In today's multimedia society in which large quantities of information have to be processed at high speed, information is digitized for recording and transmission and signals are error-correction encoded to eliminate errors arising in the course of signal recording and transmission. The received signals are decoded to extract the information. Conventional decoding uses a digital apparatus that employs semiconductor devices. JP-A 2001-7706, for example, describes an apparatus for the decoding of data that has been encoded using variable-length encoding, such as Huffman encoding. The apparatus is provided with two types of lookup tables, with one of the lookup tables being selected depending on the length of the variable-length code, and the code thereby decoded to a symbol value. This enables high-speed decoding and the use of lookup tables of smaller capacity.

However, this conventional technique cannot improve decoding speed when the encoding is fixed-length encoding, and also cannot provide an improvement in decoding speed that is in the order of several tens or several hundreds of times as fast. In the final analysis, digital processing using semiconductor devices is limited in terms of processing time and processing volume, and therefore does not provide a solution for dealing with the growing quantities of data being transmitted.

The object of the present invention is to provide a method and apparatus for decoding digital signals that can perform high-speed decoding without relying extensively on digital processing using semiconductor devices.

SUMMARY OF THE INVENTION

The present invention achieves the above object by providing a method for decoding a digital signal, the method comprising receiving a multiple-bit digital signal that includes information to be transmitted; arraying bit strings of the received multiple-bit digital signal to thereby generate a received signal image as a two-dimensional image; arraying all types of predetermined proper signals used for signals transmitted and bit strings of patterns including errors each derived from each proper signal to thereby generate a different two-dimensional image and disposing a set of received signal patterns, each comprised of an arbitrary proper signal and a group of two-dimensional images of patterns having the arbitrary proper signal added with an error, in a state that enables identification of each proper signal to thereby generate a received signal pattern image; using optical signal processing to evaluate a coefficient of correlation between the received signal image and the received signal pattern image to thereby obtain a correlation projection image in which depth and brightness intensity distribution is proportional to the coefficient of correlation; extrapolating transmitted proper signals from a region that includes a maximum point of the depth and brightness intensity distribution appearing in the correlation projection image based on a correspondence between the region and the set of received signal patterns in the received signal pattern image; and identifying transmitted information from the extrapolated proper signals.

In the method, the correlation projection image is obtained through the steps of superposing an image having the received signal image Fourier-transformed on an image having the received signal pattern image Fourier-transformed and conjugated to thereby obtain a superposed image, and that is a conjugate of a received signal image that has been Fourier-transformed, and Fourier-transforming the superposed image.

In the method, the correlation projection image is obtained through the step of using an incoherent light source to project the received signal image onto a translucent material on which the received signal pattern image has been recorded.

In the method, the received signal image is generated as a two-dimensional image through the steps of parallelizing the multiple-bit digital signal transmitted as a serial optical signal and arraying the bit strings of the parallelized multiple-bit digital signal.

In the method, the multiple-bit digital signal transmitted as a serial optical signal is parallelized through the steps of branching the digital signal into optical fibers corresponding in number to the multiple bits and adjusting transmission delay time for each optical fiber.

In the method, the received signal image is generated as a two-dimensional image using a different graphical form to correspond to each bit position in the received signal, the received signal pattern image is generated applying the different graphical form to each bit string, and the coefficient of correlation is evaluated using the generated received signal pattern image, thereby improving image matching accuracy.

The present invention also achieves the above object by providing an apparatus for decoding a digital signal, the apparatus comprising received signal image generation means that receives a multiple-bit digital signal that including information to be transmitted and arrays bit strings of the received multiple-bit digital signal to thereby generate a received signal image as a two-dimensional image; spatial frequency filtering means that arrays all types of predetermined proper signals used for signals transmitted and bit strings of patterns including errors each derived from each proper signal to thereby generate a different two-dimensional image, disposes a set of received signal patterns, each comprised of an arbitrary proper signal and a group of two-dimensional images of patterns having the arbitrary proper signal added with an error, in a state that enables identification of each proper signal to thereby generate a received signal pattern image, uses optical signal processing to evaluate a coefficient of correlation between the received signal image from the received signal image generation means and the received signal pattern image to obtain a correlation projection image in which depth and brightness intensity distribution is proportional to the coefficient of correlation; and decoding processing means that extrapolates transmitted proper signals from a region that includes a maximum point of the depth and brightness intensity distribution appearing in the correlation projection image based on a correspondence between the region and the set of received signal patterns in the received signal pattern image and identifies transmitted information from the extrapolated proper signals.

In the apparatus, the received signal image generation means includes a coherent light source to generate the received signal image; and the spatial frequency filtering means comprises a first lens that Fourier-transforms the received signal image from the received signal image generation means, a matched filter that transfers an image having the received signal image Fourier-transformed and conjugated onto a translucent material, and a second lens that Fourier-transforms a superposed image obtained by the received signal image Fourier-transformed by the first lens being passed through the matched filter to obtain a correlation projection image that is the superposed image Fourier-transformed by the second lens.

In the apparatus, the received signal image generation means includes an incoherent light source to generate the received signal image onto a correlation filter having the received signal pattern image recorded on a a translucent material to obtain the correlation projection image.

In the apparatus, the received signal image generation means comprises a serial/parallel conversion section that parallelizes bits of received serial signals and outputs the signals as parallel signals, and a display section that displays two-dimensional images based on the parallel signals from the serial/parallel conversion section.

In the apparatus, the serial/parallel conversion section branches the digital signal into optical fibers corresponding in number to the multiple bits and adjusts transmission delay time for each optical fiber to thereby parallelize the digital signal transmitted as a serial optical signal.

In the apparatus, the received signal image generation means generates the received signal image as a two-dimensional image using a different graphical form to correspond to each bit position in the received signal, and the spatial frequency filtering means generates the received signal pattern image applying the different graphical form to each bit string to improve image matching accuracy.

The above and other objects, advantages and characteristics will become apparent to those skilled in the art from the description made with reference to the accompanying drawings, in which:

BRIEF EXPLANATION OF THE DRAWINGS

FIG. 1 shows an example of a decoding table composed of six-bit transmission words containing three bits of transmission information, and error pattern groups thereof

FIG. 8 shows an example of a received signal pattern image.

FIG. 12 shows an image coherency apparatus disposed between the received signal image generation section and the first lens.

FIG. 14 is a general perspective view of a second embodiment of the apparatus for decoding digital signals according to the present invention.

DESCRIPTION OF THE PREFERRED EMBODIMENT

Figure 2:
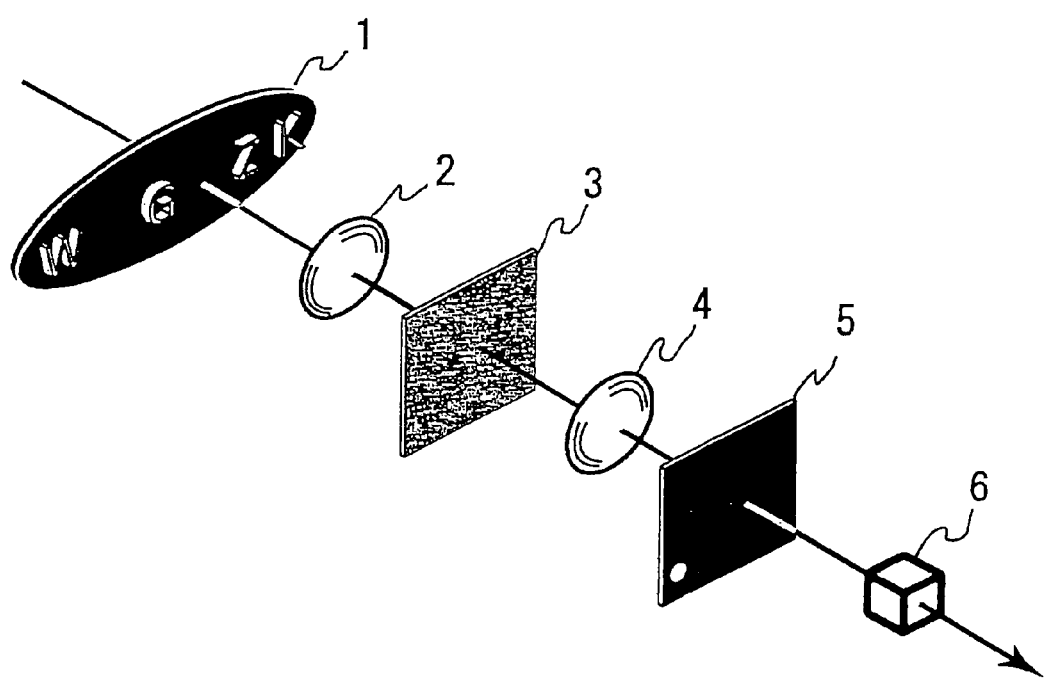
FIG. 2 is a general perspective view of a first embodiment of the apparatus for decoding digital signals according to the present invention.

Embodiments of a method for decoding digital signals according to the present invention, and of an apparatus implementing said method, will now be described with reference to the drawings. First, the decoding method principle that enables digital signals to be instantaneously decoded will be described.

A universal set U that includes all received signal patterns is composed of m types of proper signal constituted by transmission words $C_{i1}$ (i=1, 2, ..., m) error correction encoded on the transmission side and (n−1) types of error patterns $C_{ij}$ (j=2, 3, ..., n) generated from each of the transmission words, and a subset $u_i$ corresponding to each transmission word $C_{i1}$ and each transmission word resulting from error patterns $C_{i2}$ to $C_{in}$ thereof The relationship is shown in Table 1.

TABLE 1

| | Universal set U | | | | | |
|---|---|---|---|---|---|---|
| Subset | $u_1$ | $u_2$ | $u_3$ | ... $u_i$ | ... | $u_m$ |
| Transmission word | $C_{11}$ | $C_{21}$ | $C_{31}$ | ... $C_{i1}$ | ... | $C_{m1}$ |
| Error patterns | $C_{12}$ | $C_{22}$ | $C_{32}$ | ... $C_{i2}$ | ... | $C_{m2}$ |
| | $C_{13}$ | $C_{23}$ | $C_{33}$ | ... $C_{i3}$ | ... | $C_{m3}$ |
| | . | . | . | . | | . |
| | . | . | . | . | | . |
| | $C_{1j}$ | $C_{2j}$ | $C_{3j}$ | ... $C_{ij}$ | ... | $C_{mj}$ |
| | . | . | . | . | | . |
| | . | . | . | . | | . |
| | $C_{1n}$ | $C_{2n}$ | $C_{3n}$ | ... $C_{in}$ | ... | $C_{mn}$ |

The method of using pattern matching to decode signals comprises calculating the correlation values of received signal $C_r$ and all elements of the universal set U and then assuming that transmission word $C_{ij}$ of subset $u_i$ to which element $C_{ij}$ belongs, where the correlation is at a maximum, is an proper transmitted signal. For example, if the element that has the highest correlation with received signal $C_r$ is $C_{33}$, it is assumed that transmission word $C_{31}$ of subset $u_3$ to which $C_{33}$ belongs is a proper transmitted signal.

The method of decoding signals using pattern matching will now be described in more detail. Here, it is assumed that three-bit information (001, 010, 011, 100, 101, 110, 111) is being transmitted and received. FIG. 1 shows the correspondence between the information (001, 010, ..., 111) and the received signal pattern. As shown, the information is sent as transmission words each having three redundant bits attached thereto (001110, 010101, 011011, 100011, 101101, 110110, 111000). These are all the proper word types. In FIG. 1, the first bit is at the right and the sixth bit at the left.

The error patterns arrayed below each transmission word in FIG. 1 are partial bit changes in the transmission word resulting from noise. When the transmission words (proper signals) are combined the error patterns derived from the transmission words to form received signal patterns and the received signal pattern array to which a received signal actually belongs is determined, the probability is high that the transmission word (proper signal) of the received signal pattern thus determined has been transmitted. In this way, signal decoding by pattern matching comprises regarding transmission words and error patterns together as received signal patterns, assuming that a transmission word is an proper signal according to which received signal pattern the received signal is included in and identifying the transmitted information from the proper signal.

For example, if as a result of a calculation of the values of correlations between received signals and received signal patterns, the maximum value is found to be the correlation with a certain error pattern (in FIG. 1, the boxed error pattern 101011). Since this error pattern belongs to the array d of the transmission word 100011, it is inferred that the transmitted proper signal is 100011, from which the transmitted information is identified as being 100. Thus handling the error patterns and transmission word as a single received signal pattern makes it possible to promptly identify the proper received information without extra error detection processing, even if bit errors arise in the original transmission word.

When actual received signals and received signal patterns are compared, the correlation value between the two will be at a maximum when a received signal pattern and actual received signal coincide. Thus, it is only necessary to calculate the correlation between the received signal and all of the received signal patterns and take the information of the region with the highest calculated value as being the received signal information. That is, by replacing a received signal with graphical information such as a character string, also replacing all the received signal patterns with graphical information arrayed in a two-dimensional plane, and pattern-matching the two by calculating the correlations, it becomes possible to identify the graphical pattern region of the received signal pattern that coincides with the received signal graphical pattern, and if the information corresponding to the region is already known, that information can be designated as received signal information.

High-speed calculation of correlations between received signals and received signal patterns could not be really achieved using existing computers. A major technical feature of the method for decoding digital signals according to the present invention is that, by using optical information processing, correlations between a received signal and a plurality of received signal patterns can be calculated instantaneously and the proper received signal identified accordingly, enabling the realization of extremely high-speed digital signal decoding.

That is, with the method of decoding digital signals according to the present invention, to obtain a light wave based on a received signal image that displays the bit string of a received signal as a single graphical pattern, the method comprises receiving a multiple bit digital signal that includes transmission information and generating a received signal image as a two-dimensional image of the received signal bit string. To obtain a light wave based on a received signal pattern image formed by using a decoding table that encompasses all received signal patterns, the method comprises generating a received signal pattern image by generating a two-dimensional image of each bit string of all transmitted types of proper signal and error patterns derived from each proper signal and disposing a received signal pattern region comprised of an arbitrary proper signal and a group of two-dimensional images of error patterns thereof in a state that enables identification of each proper signal, using optical signal processing to calculate a correlation between the received signal pattern image and the received signal image and obtaining a correlation projection image in which the intensity distribution is proportional to cross-correlation of received signal image and received signal pattern image, and identifying transmitted information from the proper signal by extrapolating transmitted proper signals based on the correspondence between a region that includes a point of maximum brightness appearing in the correlation projection image and each received signal pattern region in the received signal pattern image.

Various types of optical correlator for obtaining cross-correlation between two images have been proposed. There is no particular limitation on the techniques used for obtaining a correlation projection image from a received signal image and received pattern image. Described below are specific examples of two methods, one using coherent light and the other using incoherent light.

In the case of a coherent received signal image light wave, a method can be used comprising using a lens to Fourier-transform the received signal image (amplitude distribution), transmitting a conjugate image of the Fourier-transformed received signal pattern image (amplitude distribution) through a matched filter formed using a conjugate image of the image obtained by Fourier-transformation of the received signal pattern image (amplitude distribution), using a lens to Fourier-transform the transmitted image (the Fourier-transformed received signal image superposed on an image that is a conjugate of the Fourier-transformed received signal pattern image), and using the image thus formed as the correlation projection image. Although in the case of coherent light, the optical processing configuration is complex, the light spot of maximum brightness (the point of highest correlation) shows up clearly in the correlation projection image, helping to prevent erroneous recognition of proper signals and thereby enabling achievement of very high decoding reliability.

In the case of an incoherent received signal image light wave, an image formed by projecting the received signal image (amplitude distribution) onto a translucent film to which the received signal pattern image (amplitude distribution) has been transferred (forming a correlation filter) can be used as the correlation projection image. Although in the case of incoherent light, the light spot of maximum brightness (the point of highest correlation) is slightly blurred, it has the advantage of using a simple optical processing configuration. Also, although in the case of incoherent light it is necessary to take into account the distance between images, image size and other factors, existing technology can be used, such as with respect to placement of lenses and adjustment of focal length.

A digital signal decoding apparatus that implements the above digital signal decoding method will now be described, with reference to the drawings.

FIG. 2 is a general perspective view of a first embodiment of an apparatus for decoding digital signals according to the present invention, using coherent light. Reference numeral 1 denotes a received signal image generation section, constituting means for receiving a multiple bit digital signal that includes transmission information and generating a received signal image as a two-dimensional image of the received signal bit string. On the output side, there is a lens 2 that Fourier-transforms received signal images from the received signal image generation section 1. A matched filter 3 is provided on the output side of the lens 2.

The matched filter 3 comprises a translucent material onto which has been transferred a conjugate of an image obtained by Fourier-transforming a received signal pattern image produced by generating a two-dimensional image of each bit string of all transmitted types of proper signal and error patterns derived from each proper signal and disposing a received signal pattern region comprised of an arbitrary proper signal and a group of two-dimensional images of error patterns thereof in a state that enables identification of each proper signal.

A second lens 4 is provided on the output side of the matched filter 3 that Fourier-transforms a superposed image obtained by the received signal image Fourier-transformed by the first lens 2 being passed through the matched filter 3. A translucent screen 5 is provided on the output side of the lens 4. A correlation projection image is formed on this screen 5. A photoelectric conversion element 6, provided on the output side of the screen 5, is used to obtain an electric signal corresponding to the light intensity of images transmitted by the screen 5. The screen 5 is not limited to being translucent, and may be reflective, in which case the photoelectric conversion element 6 will be located where it can receive light reflected by the screen.

Thus, in this embodiment in which a coherent light source is used to generate the received signal image, the first lens 2, matched filter 3 and second lens 4 functionally constitute a spatial frequency filtering means that uses optical signal processing to calculate a correlation between a received signal image from the received signal image generation means and a received signal pattern image generated by generating a two-dimensional image of each bit string of all transmitted types of proper signal and error patterns derived from each proper signal and disposing a received signal pattern region comprised of an arbitrary proper signal and a group of two-dimensional images of error patterns thereof in a state that enables identification of each proper signal, to obtain a correlation projection image in which the intensity distribution is proportional to the cross-correlation of the received signal image and received signal pattern image.

The relevant received signal in the received pattern region concerned can be extrapolated based on the correspondence between a region that includes a point of maximum brightness appearing in the correlation projection image formed on the screen 5, and each received signal pattern region in the received signal pattern image constituting the original image of the matched filter 3. Once the received signal is extrapolated, the transmission information contained therein can be identified, thus enabling the digital signal to be decoded. Identification of transmission information based on the point image of maximum brightness appearing on the screen can be readily achieved using conventional image processing technology. For this, the signal output of the photoelectric conversion element 6 is supplied to the specialized hardware concerned. Thus, the photoelectric conversion element 6 and the specialized hardware (not shown) constitute decoding processing means that identifies transmitted information from the proper signal by extrapolating transmitted proper signals based on correspondence between a region that includes a point of maximum brightness appearing in the correlation projection image obtained by the spatial frequency filtering means, and each received signal pattern region in the received signal pattern image.

In the configuration of the embodiment shown in FIG. 2, the photoelectric conversion element 6 is separate from the screen 5. However, any construction can be used that enables the point of maximum correlation (point of maximum brightness) to be detected. Thus, the screen 5 per se can be provided with a photoelectric conversion function. With respect to detecting the point of the highest correlation, region determination can be efficiently effected by threshold filtering the photoelectrically converted signal so that only the point image of the region having the highest correlation with a received signal is acquired.

The received signal image generation section 1 receives multiple bit digital signals that include transmission information, and generates a received signal image as a two-dimensional image of the received signal bit string. The signals are not limited to optical signals, and may be electric or radio wave signals transmitted by wire or wirelessly; nor is there any limitation on the frequency band thereof. An example will now be described, with reference to FIG. 3, of the generation of a signal image from a received optical signal constituted as a train of serial pulse along a time axis.

Figure 3:
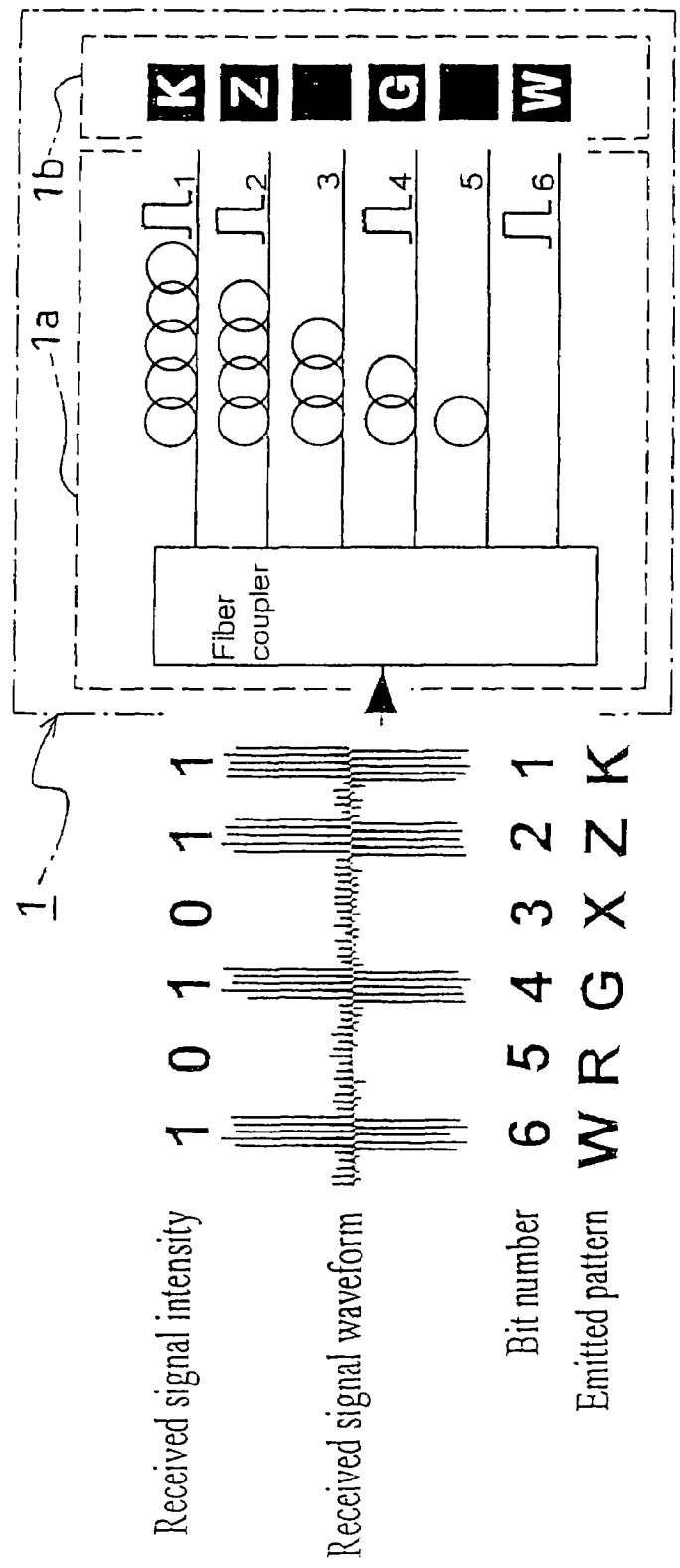
FIG. 3 shows the serial/parallel conversion section and display section of the received signal image generation section used in the apparatus of FIG. 2.

The received signal image generation section 1 shown in FIG. 3 comprises a serial/parallel conversion section 1a and a display section 1b. The serial/parallel conversion section 1a can comprise, for example, a fiber coupler and optical fibers along which optical signals are branched by the fiber coupler. By means of the display section 1b, light from the optical fibers of the serial/parallel conversion section 1a is projected onto the lens 2 as substantially parallel beams. N optical fibers are connected to the fiber coupler, where N is the number of signal bits of serial signals input to the fiber coupler. If T is the pulse width of one bit of a received signal, the length of each fiber is adjusted to produce a propagation delay time differences of $(N-1)T, (N-2)T, \ldots, 2T, T, 0$ across the first to the last input bits, whereby the serial signals output from the optical fibers are delivered to the display section 1b with the bit strings thereof parallelized. Thus using a fiber coupler and optical fibers that double as delay lines to constitute the serial/parallel conversion section has the advantage of enabling high-precision adjustment of the delay on a bit by bit basis, using a relatively simple construction.

The display section 1b only outputs a received signal image for the duration of the output from the optical fibers of the last signal bit having a zero delay difference, so signals output from the photoelectric conversion element 6 at that timing have to be used to identify the transmission information. Therefore, a configuration is used whereby, for example, the photoelectric conversion element 6 signal is received and an optical signal that is also received by the processing means used to extrapolate proper signals is supplied to enable determination of the timing at which the last bit of the optical signal is displayed on the display section 1b. Also, when the propagation delay time is adjusted by changing the length of the optical fiber transmission path, since attenuation is lower with a shorter path and higher with a longer path, in adjusting the intensity of a branched optical signal, it is desirable to take into consideration the amount of attenuation of the fibers corresponding to each bit to ensure that the optical signals supplied to the display section 1b are of substantially equal intensity.

The display section 1b can be comprised of characters and symbols formed of a translucent material, so that passing the light beams through the translucent material produces a luminescent display of characters and symbols corresponding to the shape of the material. The display section 1b is not limited to the above configuration, but may instead have any configuration that enables such display of characters and symbols corresponding to the bit signals. The light-emitting devices or light-radiating devices that are activated by optical signals from the serial/parallel conversion section 1a are connected to enable the display section 1b to be configured. The display section 1b could be thus configured to emit or radiate light only when the intensity of a signal input from the serial/parallel conversion section 1a is above a specific level.

Two-dimensional images displayed by a display section 1*b* thus configured, corresponding to bit values (zeros and ones) parallelized by the serial/parallel conversion section 1*a*, have portions that are displayed, such as characters and symbols, and portions that are not displayed, which together form a single received signal image. In the received signal image generation section 1 of this embodiment, for example, the first optical fiber displays K when the value of the first bit is "1" and the relative delay time is 5T, the second optical fiber displays Z when the value of the second bit is "1" and the relative delay time is 4T, the third optical fiber displays X when the value of the third bit is "1" and the relative delay time is 3T, the fourth optical fiber displays G when the value of the fourth bit is "1" and the relative delay time is 2T, the fifth optical fiber displays R when the value of the fifth bit is "1" and the relative delay time is 1T, and the sixth optical fiber displays W when the value of the sixth bit is "1" with a zero relative delay time. When the bit value is "0", the light-emitting or light-radiating devices do not operate, so nothing is displayed.

Figure 4:
FIG. 4 shows an example of an image output by the received signal image generation section of FIG. 3.

The example of FIG. 3 shows the six-bit received signal 101011. The first bit is "1", with a relative delay time of 5T, so K is displayed; the second bit is "1", with a relative delay time of 4T, so Z is displayed; the third bit is "0", with a relative delay time of 3T, so a blank (_)is displayed; the fourth bit is "1", with a relative delay time of 2T, so G is displayed; the fifth bit is "0", with a relative delay time of T, so a blank is displayed; and the sixth bit is "1", with a relative delay time of T, so W is displayed. Thus, W_G_ZK is displayed. FIG. 4 shows an example of an actual image as seen from the output side of the received signal image generation section 1. In the case of this drawing, looking at the page, the first bit is on the right and the sixth bit on the left.

In the above example, a different alphabetic character (graphical form) is assigned to correspond to each bit position with the aim of increasing the pattern-matching accuracy. While the use of alphabetic characters is not limitative, the graphical forms used should be ones that appear with a marked difference in terms of magnitude of correlation value. In accordance with the basic principle of matching, even in the case of a parallelized signal image formed by the presence or absence of light spots having a simple shape such as round or square, correlation can be judged from an array of such light spots, so the method is not limited to a technique of creating a received image signal by assigning different graphical forms to the bit positions or values. Similarly, the shape of the bit arrays is not limited to the single horizontal line shown in this example. In the case of a long data length, it can be arrayed in two or three or more rows, or radially, or in a circle, square or any other shape desired.

Moreover, the received signal image generation section is not limited to the one shown in the above example, but may be of any configuration that is able to generate an image corresponding to a received signal. For example, in the case of an optical signal received as a parallel signal, there is no need for a serial/parallel conversion section. All that is needed is the ability to control the emission/non-emission of the display section 1*b*, in accordance with each bit value of an input signal.

Figure 5:
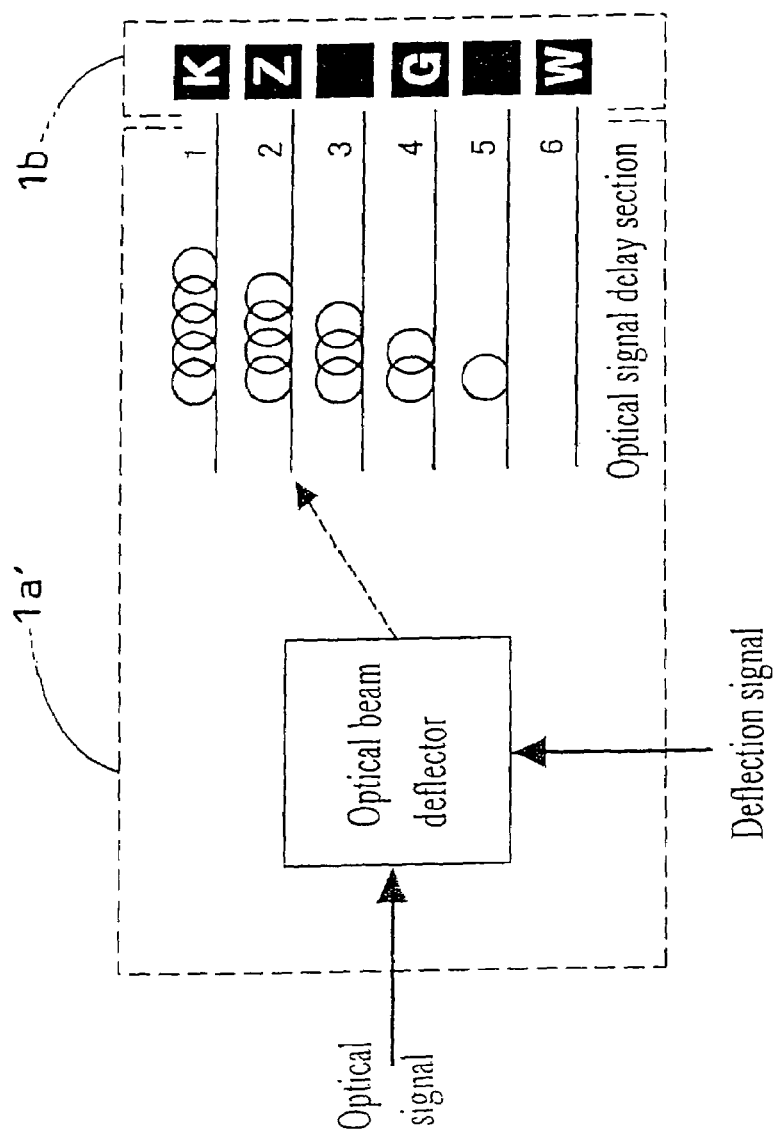
FIG. 5 shows the composition of a received signal image generation section that uses a serial/parallel conversion section.

The serial/parallel conversion function that the received signal image generation section 1 is provided with also is not limited to the one of the above example. For example, the configuration of FIG. 5 can be used, in which, in place of a fiber coupler, a serial/parallel conversion section 1*a*' uses an optical beam deflector that deflects a received optical signal to different output paths. In this example, each first signal bit is deflected to a first optical fiber, the second bit to the second fiber, the third bit to the third fiber, the fourth bit to the fourth fiber, the fifth bit to the fifth fiber and the sixth bit to the sixth fiber, thereby converting a serial signal to a parallel signal. With a beam deflector, the signal does not have to be branched to each fiber, so the light output from the fiber end has substantially the same intensity as the input signal. So the advantage of using a beam deflector is that it makes it readily possible to obtain the amount of light required to generate a received signal image without using an amplifier.

Figure 6:
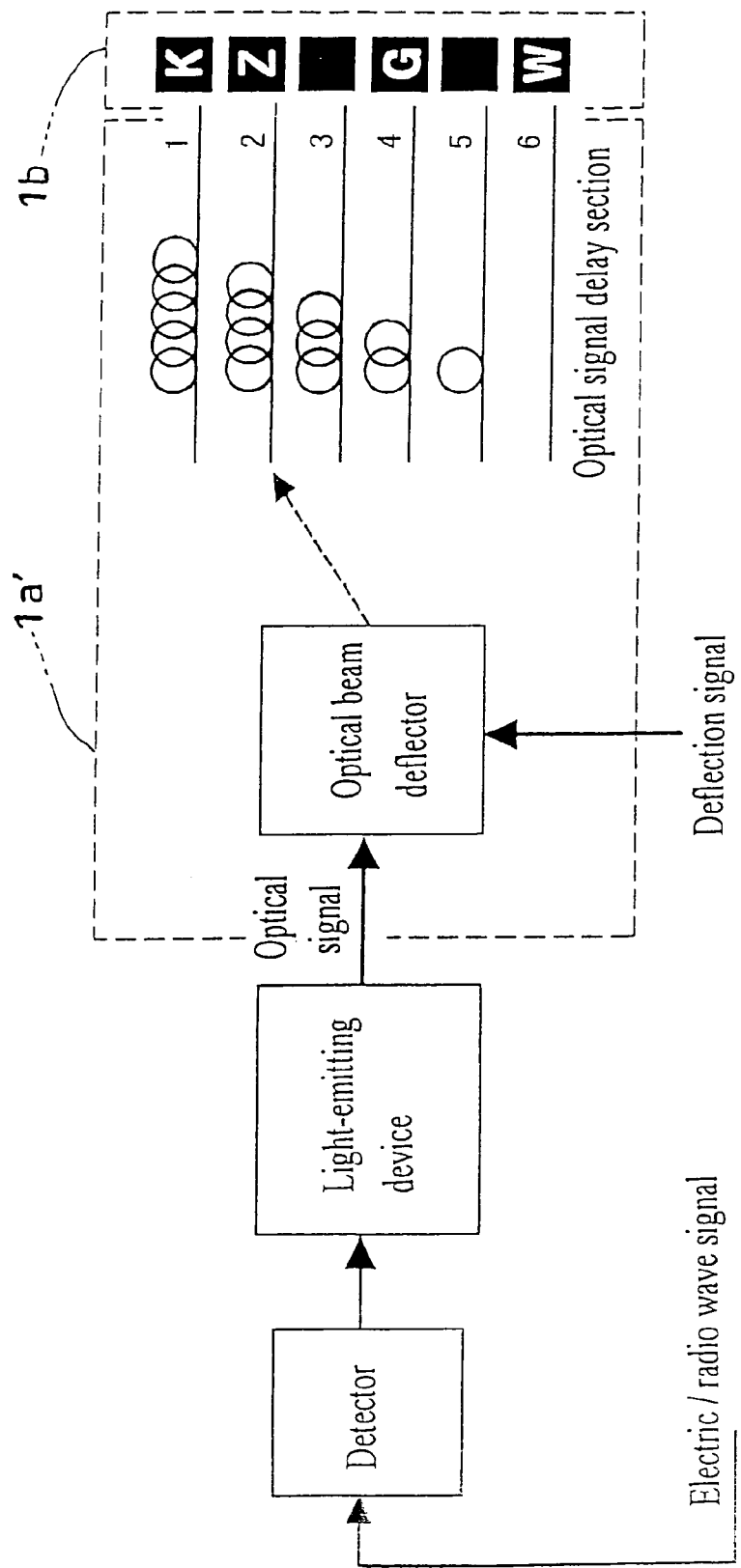
FIG. 6 shows an example of a received signal image generation section for when the received signal is an electric or radio wave signal.

The signals received by the received signal image generation section 1 for generating received image signals are not limited to optical signals, and may be electric or radio wave signals transmitted by wire or wirelessly. For example, a configuration such as the one shown in FIG. 6 can be used when the received signal is a digital signal transmitted as an electric or radio wave. By using a wave detector and a light-emitting device to convert the received signal to an optical signal, the signal can be converted to a parallel using the same kind of processing as that of the serial/parallel conversion sections 1*a* and 1*a*'.

Figure 7:
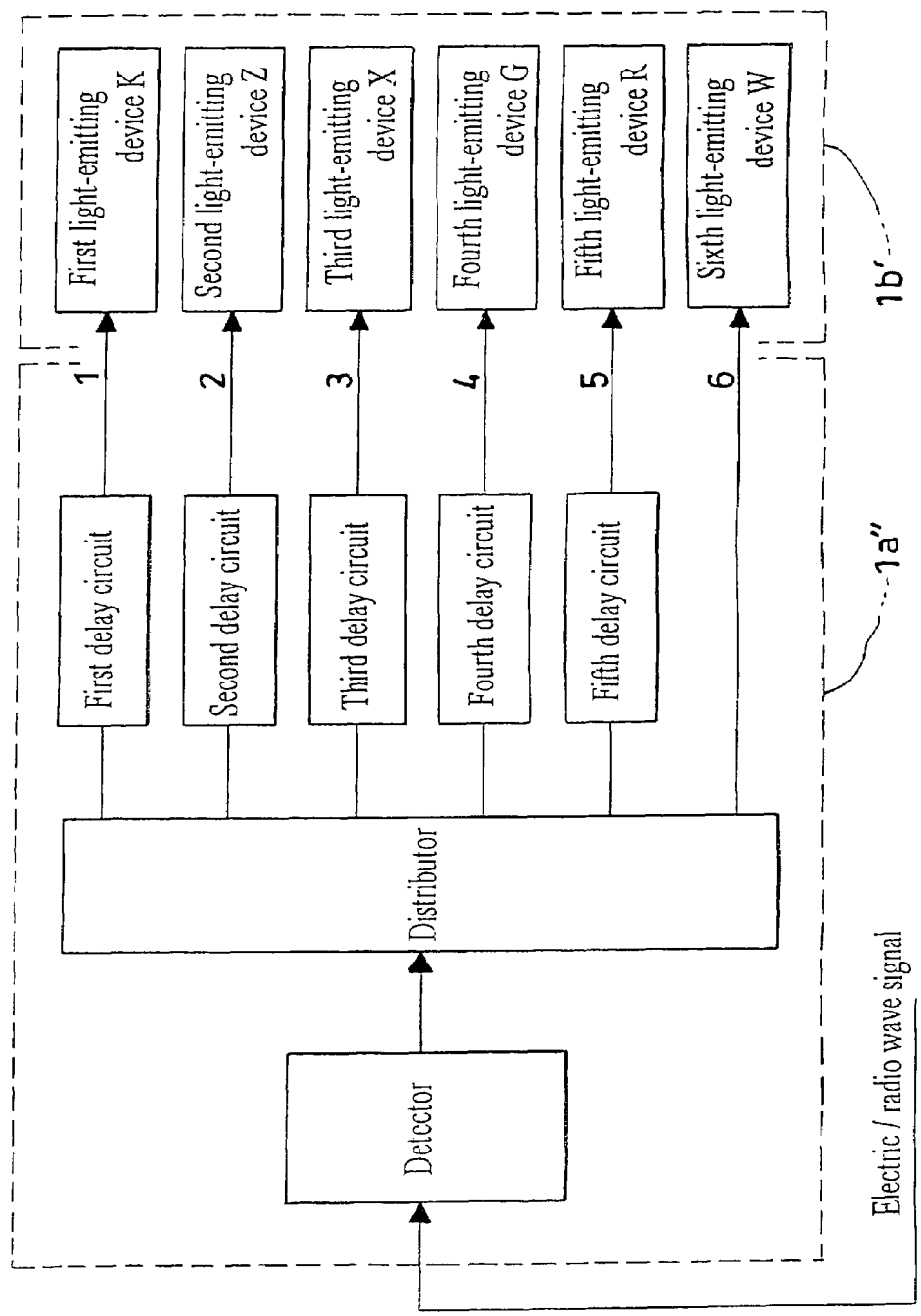
FIG. 7 shows another example of a received signal image generation section for when the received signal is an electric or radio wave signal.

When a digital signal transmitted as an electric or radio wave is used to generate a received signal image, the configuration for converting the optical signal to a parallel signal is not limited to the above one. For example, the configuration shown in FIG. 7 can be used, in which the received signal is distributed to a first signal line having a first delay circuit with a relative delay time of 5T, a second signal line having a second delay circuit with a relative delay time of 4T, a third signal line having a third delay circuit with a relative delay time of 3T, a fourth signal line having a fourth delay circuit with a relative delay time of 2T, a fifth signal line having a fifth delay circuit with a relative delay time of T and a sixth signal line having no delay circuit, thereby activating a first light-emitting device (for K), a second light-emitting device (for Z), a third light-emitting device (for X), a fourth light-emitting device (for G), a fifth light-emitting device (for R) and a sixth light-emitting device (for W), respectively. With the sixth bit of the signal being used to effect the timing at which the sixth light-emitting device is switched on (or kept off), the first to fifth bits are used for the on/off switching of the respective first to fifth light-emitting devices, to thereby generate the received signal image.

Figure 9:
FIG. 9 is an enlarged view of a portion of a matched filter density pattern.

The matched filter 3 on which is projected the Fourier-transformed image of the received signal image thus generated, comprises a film of a translucent material onto which is formed a conjugate image of the received signal pattern image that has been Fourier-transformed. FIG. 8 shows an example of an original received signal pattern image used for this, which is positioned in regions into which the received signal pattern images shown in the decoding table of FIG. 1 are divided on a transmitted information by information basis (hereinafter, these will be referred to as "received signal pattern regions"). Thus, the signal images (alphabetic character images corresponding to the bit strings) corresponding to the received signal patterns are arranged in the regions a to g corresponding to the transmitted information. The broken lines in FIG. 8 are not part of the images; they just indicate the boundaries of the regions. FIG. 9 shows an enlarged view of part of the matched filter 3. The output image from the matched filter 3 is a superposed image that is a conjugate of the Fourier-transformed received signal image and the Fourier-transformed received signal pattern image. Thus, substantially, the output image from the matched filter 3 includes the outcome of the calculated correlation between received signal image and received signal pattern image. In the correlation projection image that is the output image Fourier-transformed by the lens 4, the point of highest correlation appears as a point of maximum brightness.

Figure 10:
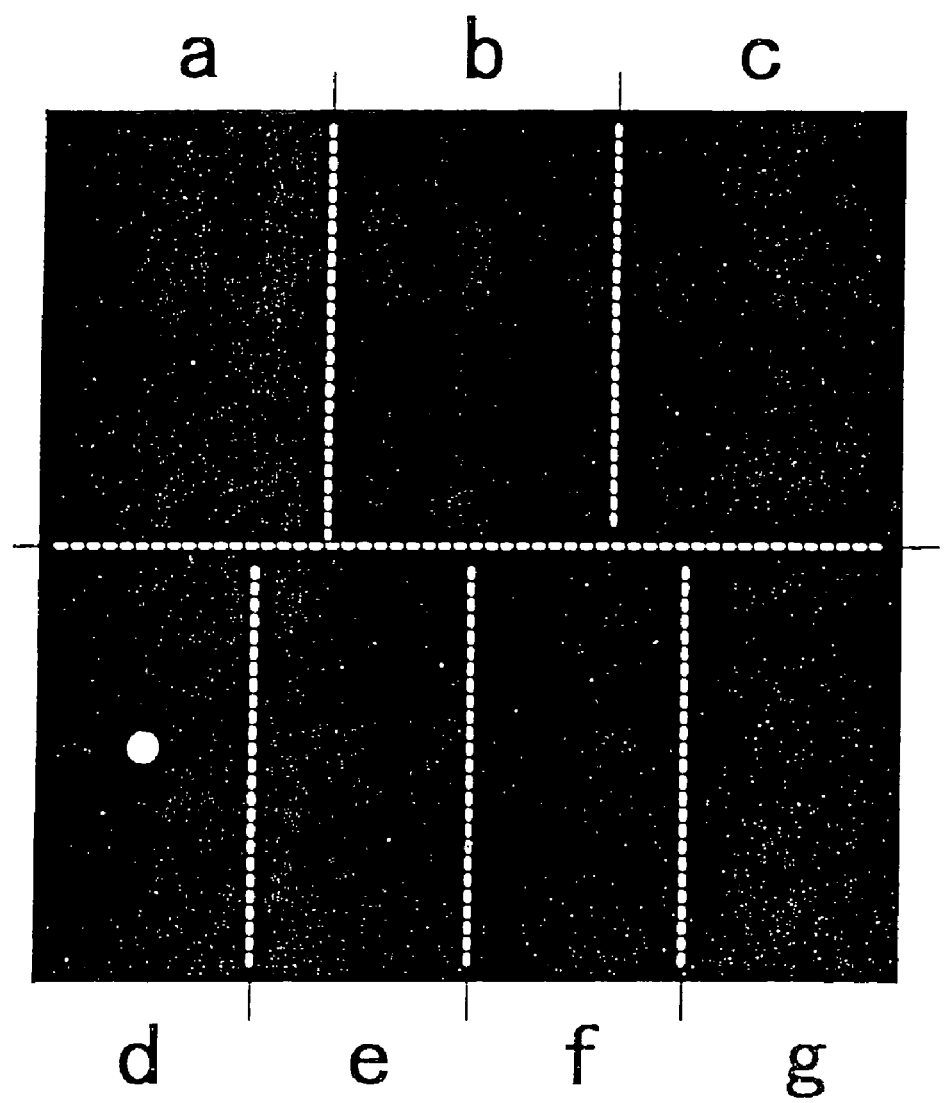
FIG. 10 is an example of a screen on which a point of maximum brightness has appeared.

The output image from the lens 4 displayed on the screen 5 includes numerous point images corresponding to correlations with received signal pattern images. The brightness of these point images is proportional to the correspondence values between the received signal image and each of the received signal pattern images. That is, the point image indicates the location of maximum correlation with the received signal image. Based on the correspondence between the screen region where the point image of maximum brightness appears and the regions in the received signal pattern image, the proper signal can be inferred. For example, if an error arises in the fourth bit of the transmitted signal 100011, so that the received signal is 101011 (W_G_ZK), the maximum correlation value will be obtained in region d of the signal image (the lower left in FIG. 8), so in the screen 5 shown in FIG. 10, the point image of maximum brightness also appears in the d region at the lower left.

The photoelectric conversion element 6 converts the point image of maximum brightness thus displayed on the screen 5 to information for region determination processing. For example, if the received signal is 101011, the photoelectric conversion element 6 provides the information that the point image of maximum brightness is located at the lower left, so that if the boundary information of the regions a to g is known, it can be determined that the point image of maximum brightness belongs to region d. That is, based on the correspondence between the region on the screen 5 in which the point of maximum brightness is located and each of the regions of the received signal pattern image, it can be inferred that the proper signal is 100011 (W_ZK), enabling identification of the transmission information, 100, of the proper signal. In this way, high-speed digital signal decoding is achieved by optical information processing.

In the apparatus configuration of this embodiment, the screen 5 is used to make the point of maximum brightness visible. However, this is not limitative. Instead, a configuration can be used in which the Fourier-transformed image is projected directly to the photoelectric conversion element 6. There is no particular limitation on the method of identifying the transmission information from the information from the photoelectric conversion element 6; any of the various conventional methods can be used. There is also no particular limitation on the optical output from the received signal image generation section 1. However, when the light projected at the matched filter 3 is coherent light, detection accuracy is improved since the brightness of the image that coincides with the pattern is higher. The following explanation is given with reference to an example in which a coherent image is projected at the first lens.

Figure 11:
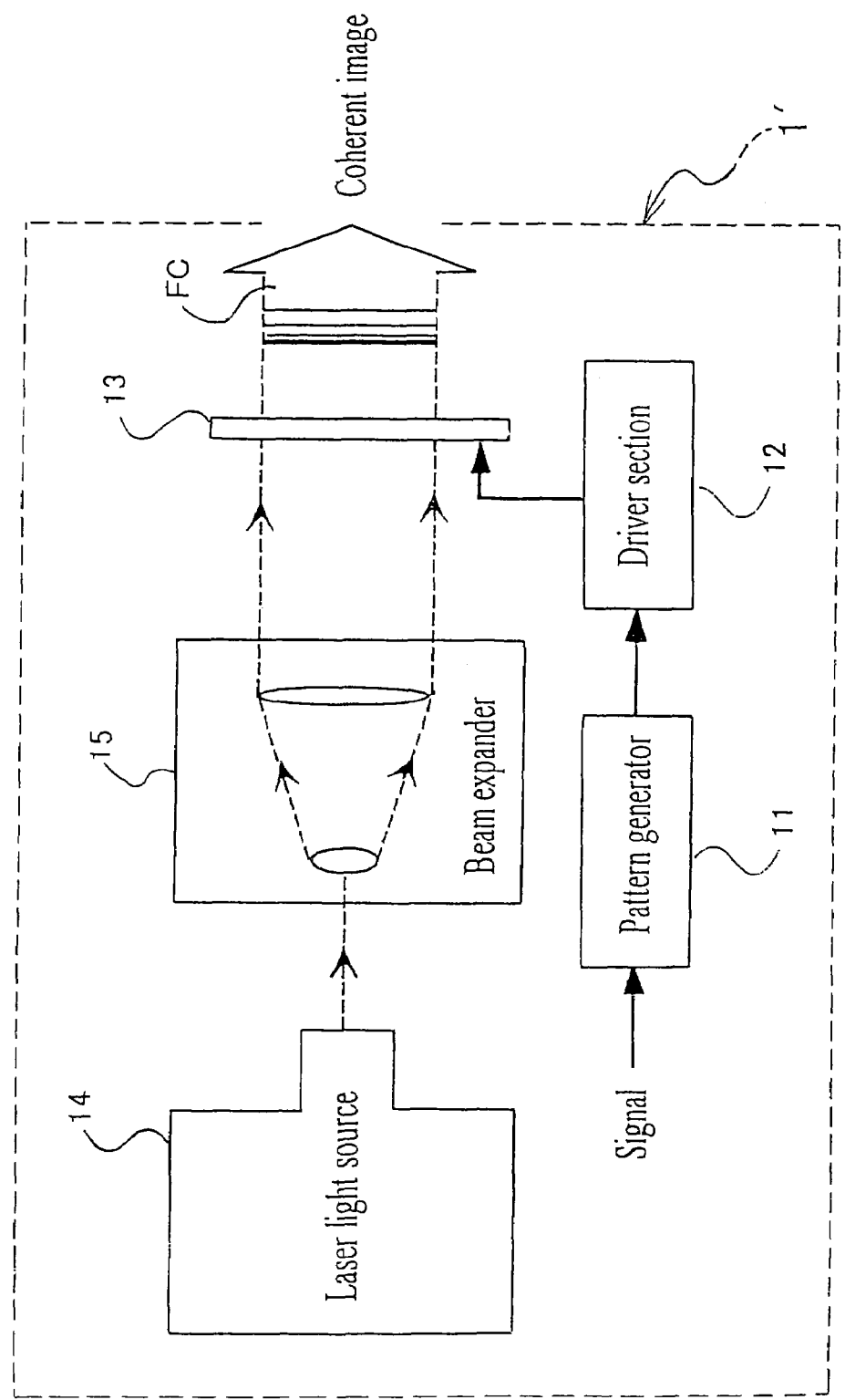
FIG. 11 shows a second example of the received signal image generation section used in the apparatus of FIG. 2.

FIG. 11 shows a second example of the received signal image generation section used in the digital signal decoding apparatus of FIG. 2. In this example, the received signal image generation section 1' is used to obtain a coherent image by projecting liquid-crystal backlight as the coherent light. The received signal is input to the pattern generator 11, which generates a fixed pattern (graphical form) for each signal bit. The pattern signals thus generated are applied to a driver section 12 that drives an electric-signal addressable liquid-crystal panel 13 to display an image corresponding to the input signal. If the input signal is 101011, for example, the image "W_G_ZK" would be displayed.

The laser beam output by laser light source 14 is expanded by means of a beam expander 15 so that the beam is projected onto the whole display region of the liquid-crystal panel 13. Since the beam is projected onto the back of the liquid-crystal panel 13, coherent light is only transmitted by the "W_G_ZK" in the panel transmission state, thereby providing the transmitted coherent image "W_G_ZK" indicated in FIG. 11 by the arrow FC.

In the configuration shown in FIG. 12, an image coherency apparatus 7 is located between the received signal image generation section 1 and the first lens 2 to convert the image from the section 1 to a coherent image. The function of the image coherency apparatus 7 can be included in the received signal image generation section 1, enabling the section 1 to generate a coherent image. It is shown as a separate function here in order to concentrate on the description of the function of converting the received signal image to a coherent image.

The received signal image from the received signal image generation section 1 is projected onto an optically addressable spatial optical modulator 71 of the image coherency apparatus 7. The optical modulator 71 is constituted by transparent electrodes 712a and 712b formed on the opposing surfaces of a pair of glass plates 711a and 711b, and a photoconductive layer 713, a dielectric mirror 714 and an optical modulation layer 715 disposed between the electrodes 712a and 712b. A drive power source 716 is connected across the electrodes 712a and 712b.

When a received signal image falls incident from the glass plate 711a side (indicated in FIG. 12 by the arrow FD), the photoconductive layer 713 is invested with conductivity corresponding to the intensity distribution of the incident light and, via the electrodes 712a and 712b, the drive power source 716 applies a voltage to the optical modulation layer 715 corresponding to the conductive portions. Thus, on the glass plate 711b side, an optically modulated region is formed that has the same form as the received signal image from the section 1.

As such, when the beam expander 73 projects the coherent light onto a beam-splitter 74, the coherent light from beam-splitter 74 that is projected onto the glass plate 711b of the spatial optical modulator 71 is modulated by the optical modulation region produced in the optical modulation layer 715. That is, the laser beam projected onto the glass plate 711b side is optically modulated according to the intensity distribution of the light projected onto the glass plate 711a side, so a coherent image (indicated by the arrow FC in FIG. 12) can be obtained from the beam-splitter 74 that corresponds to the received signal image.

Figure 13A:
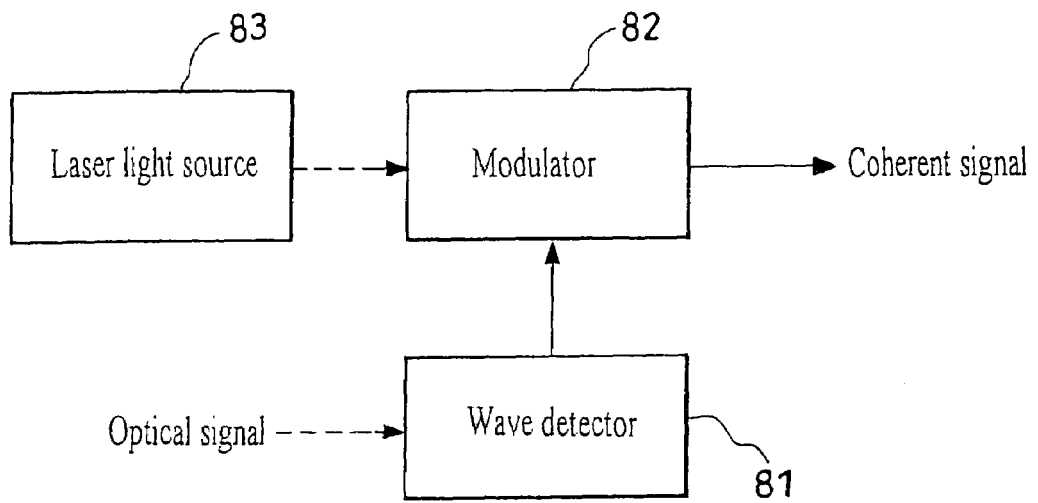
FIG. 13(a) shows an example of a configuration for converting an optical signal to a coherent signal.
Figure 13B:
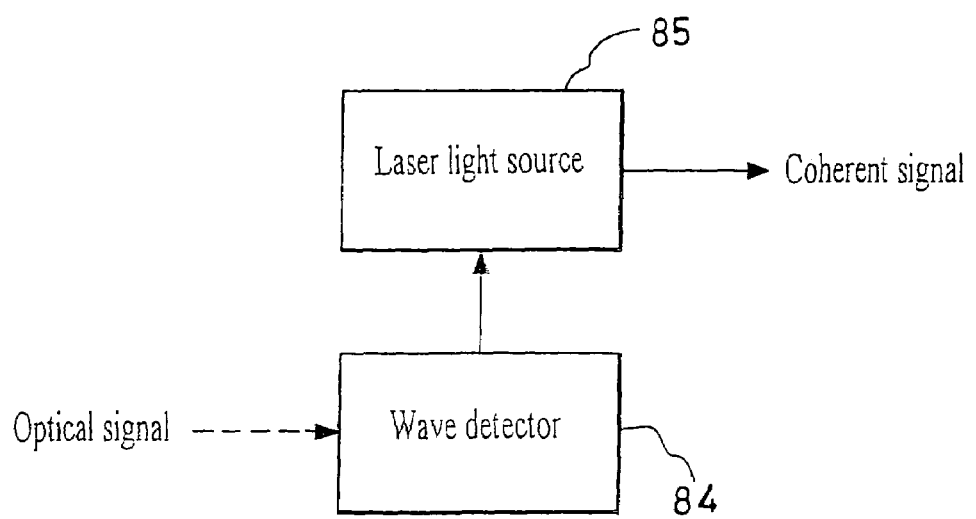
FIG. 13(b) shows another example of a configuration for converting an optical signal to a coherent signal.

FIG. 13 shows how the optical signal is converted to a coherent signal in order to obtain a coherent image. As shown in FIG. 13(a), by using a modulator 82 controlled by an optical signal detected by means of an optical detector 81 to modulate the coherent beam from a laser light source 83, it is possible to generate a coherent signal corresponding to the optical signal. Modulation can also be controlled without using an optical detector 81, by inputting the optical signal to a direct-drive type modulator. Also, as shown in FIG. 13(b), a coherent signal corresponding to the optical signal can also be generated using a laser light source 85 to directly control the modulation of the optical signal detected by the optical detector 84.

A digital signal decoding apparatus according to a second embodiment that uses incoherent light will now be described with reference to FIG. 14. Received signal image generation section 91 uses an incoherent light source to generate a received signal image that is projected onto the entire surface of a correlation filter 92. The correlation filter 92 is constituted as a film of translucent material onto which the received signal pattern images have been transferred (images produced by generating a two-dimensional image of each bit string of all transmitted types of proper signal and error patterns derived from each proper signal and disposing a received signal pattern region comprised of an arbitrary proper signal and a group of two-dimensional images of error patterns thereof in a state that enables identification of each proper signal).

The transmission by the correlation filter 92 enables received signal image and received signal pattern image to be superposed. The superposed image passes through a focal length adjusting lens 93 to a translucent screen 94, to thereby obtain a correlation projection image. The principle of using incoherent light. to process optical signals is described in, for example, pages 106-107 of "Optical Signal Processing Principles," edited by Junpei Tsujiuchi and Kazumi Murata, published by Asakura Co. A photoelectric conversion element 95 on the output side of the screen 94 is used to obtain an electric signal corresponding to the optical intensity of the images transmitted by the screen 94. Digital signal decoding is thereby effected using decoding processing means (not shown) constituted similarly to that of the first embodiment.

The correlation filter 92, lens 93 and screen 94 of this embodiment constitute the spatial frequency filtering means that uses optical signal processing to calculate a correlation between a received signal image from the received signal image generation means and a received signal pattern image generated by generating a two-dimensional image of each bit string of all transmitted types of proper signal and error patterns derived from each proper signal and disposing a received signal pattern region comprised of an arbitrary proper signal and a group of two-dimensional images of error patterns thereof in a state that enables identification of each proper signal, to obtain a correlation projection image in which the intensity distribution is proportional to cross-correlation of received signal image and received signal pattern image. However, this is not limitative. The lens 93 can be omitted and the distance between the correlation filter 92 and the screen 94, or the size of the screen 94, adjusted to achieve image formation on the screen 94.

As described in the foregoing, in accordance with the method for decoding digital signals according to the present invention, optical signal processing is used to calculate the correlation between received signal images and received signal pattern images to obtain a correlation projection image in which the intensity distribution is proportional to cross-correlation between the received signal images and received signal pattern images. Then, transmitted information from the proper signal is identified by extrapolating transmitted proper signals based on the correspondence between a region that includes a point of maximum brightness appearing in the correlation projection image and each received signal pattern region in the received signal pattern images. This enables digital signals to be decoded with high speed and efficiency, making the method an effective one for receiving large quantities of information at high speed without errors.

The above digital signal decoding method is realized by a digital signal decoding apparatus comprising received signal image generation means, spatial frequency filtering means and decoding processing means, making the apparatus an effective one for receiving large quantities of information at high speed without errors.

What is claimed is:

1. A method for decoding a digital signal, comprising:
   receiving a multiple-bit digital signal that includes information to be transmitted;
   arraying bit strings of the received multiple-bit digital signal to thereby generate a received signal image as a two-dimensional image;
   arraying predetermined proper signals used for signals transmitted and bit strings of patterns including errors each derived from each proper signal to thereby generate a different two-dimensional image and disposing a set of received signal patterns, each comprised of an arbitrary proper signal and a group of two-dimensional images of patterns having the arbitrary proper signal added with an error, in a state that enables identification of each proper signal to thereby generate a received signal pattern image;
   using optical signal processing to evaluate a coefficient of correlation between the received signal image and the received signal pattern image to thereby obtain a correlation projection image in which depth and brightness intensity distribution is proportional to the coefficient of correlation;
   extrapolating transmitted proper signals from a region that includes a maximum point of the depth and brightness intensity distribution appearing in the correlation projection image based on a correspondence between the region and the set of received signal patterns in the received signal pattern image; and
   identifying transmitted information from the extrapolated proper signals.

2. The method according to claim 1, wherein the correlation projection image is obtained through the steps of superposing an image having the received signal image Fourier-transformed on an image having the received signal pattern image Fourier-transformed and conjugated to thereby obtain a superposed image, and Fourier-transforming the superposed image.

3. The method according to claim 1, wherein the correlation projection image is obtained through the step of using an incoherent light source to project the received signal image onto a translucent material on which the received signal pattern image has been recorded.

4. The method according to claim 1, wherein the received signal image is generated as a two-dimensional image through the steps of parallelizing the multiple-bit digital signal transmitted as a serial optical signal and arraying the bit strings of the parallelized multiple-bit digital signal.

5. The method according to claim 2, wherein the received signal image is generated as a two-dimensional image through the steps of parallelizing the multiple-bit digital signal transmitted as a serial optical signal and arraying the bit strings of the parallelized multiple-bit digital signal.

6. The method according to claim 3, wherein the received signal image is generated as a two-dimensional image through the steps of parallelizing the multiple-bit digital signal transmitted as a serial optical signal and arraying the bit strings of the parallelized multiple-bit digital signal.

7. The method according to claim 4, wherein the multiple-bit digital signal transmitted as a serial optical signal is parallelized through the steps of branching the digital signal into optical fibers corresponding in number to the multiple bits and adjusting transmission delay time for each optical fiber.

8. The method according to claim 5, wherein the multiple-bit digital signal transmitted as a serial optical signal is parallelized through the steps of branching the digital signal into optical fibers corresponding in number to the multiple bits and adjusting transmission delay time for each optical fiber.

9. The method according to claim 6, wherein the multiple-bit digital signal transmitted as a serial optical signal is parallelized through the steps of branching the digital signal into optical fibers corresponding in number to the multiple bits and adjusting transmission delay time for each optical fiber.

10. The method according claim 1, wherein the received signal image is generated as a two-dimensional image using a different graphical form to correspond to each bit position in the received signal, the received signal pattern image is generated applying the different graphical form to each bit string, and the coefficient of correlation is evaluated using the generated received signal pattern image, thereby improving image matching accuracy.

11. The method according claim 2, wherein the received signal image is generated as a two-dimensional image using a different graphical form to correspond to each bit position in the received signal, the received signal pattern image is generated applying the different graphical form to each bit string, and the coefficient of correlation is evaluated using the generated received signal pattern image, thereby improving image matching accuracy.

12. The method according claim 3, wherein the received signal image is generated as a two-dimensional image using a different graphical form to correspond to each bit position in the received signal, the received signal pattern image is generated applying the different graphical form to each bit string, and the coefficient of correlation is evaluated using the generated received signal pattern image, thereby improving image matching accuracy.

13. The method according claim 4, wherein the received signal image is generated as a two-dimensional image using a different graphical form to correspond to each bit position in the received signal, the received signal pattern image is generated applying the different graphical form to each bit string, and the coefficient of correlation is evaluated using the generated received signal pattern image, thereby improving image matching accuracy.

14. The method according claim 5, wherein the received signal image is generated as a two-dimensional image using a different graphical form to correspond to each bit position in the received signal, the received signal pattern image is generated applying the different graphical form to each bit string, and the coefficient of correlation is evaluated using the generated received signal pattern image, thereby improving image matching accuracy.

15. The method according claim 6, wherein the received signal image is generated as a two-dimensional image using a different graphical form to correspond to each bit position in the received signal, the received signal pattern image is generated applying the different graphical form to each bit string, and the coefficient of correlation is evaluated using the generated received signal pattern image, thereby improving image matching accuracy.

16. The method according claim 7, wherein the received signal image is generated as a two-dimensional image using a different graphical form to correspond to each bit position in the received signal, the received signal pattern image is generated applying the different graphical form to each bit string, and the coefficient of correlation is evaluated using the generated received signal pattern image, thereby improving image matching accuracy.

17. The method according claim 8, wherein the received signal image is generated as a two-dimensional image using a different graphical form to correspond to each bit position in the received signal, the received signal pattern image is generated applying the different graphical form to each bit string, and the coefficient of correlation is evaluated using the generated received signal pattern image, thereby improving image matching accuracy.

18. The method according claim 9, wherein the received signal image is generated as a two-dimensional image using a different graphical form to correspond to each bit position in the received signal, the received signal pattern image is generated applying the different graphical form to each bit string, and the coefficient of correlation is evaluated using the generated received signal pattern image, thereby improving image matching accuracy.

19. An apparatus for decoding a digital signal, comprising:
received signal image generation means that receives a multiple-bit digital signal that including information to be transmitted and arrays bit strings of the received multiple-bit digital signal to thereby generate a received signal image as a two-dimensional image;
spatial frequency filtering means that arrays all types of predetermined proper signals used for signals transmitted and bit strings of patterns including errors each derived from each proper signal to thereby generate a different two-dimensional image, disposes a set of received signal patterns, each comprised of an arbitrary proper signal and a group of two-dimensional images of patterns having the arbitrary proper signal added with an error, in a state that enables identification of each proper signal to thereby generate a received signal pattern image, uses optical signal processing to evaluate a coefficient of correlation between the received signal image from the received signal image generation means and the received signal pattern image to obtain a correlation projection image in which depth and brightness intensity distribution is proportional to the coefficient of correlation; and
decoding processing means that extrapolates transmitted proper signals from a region that includes a maximum point of the depth and brightness intensity distribution appearing in the correlation projection image based on a correspondence between the region and the set of received signal patterns in the received signal pattern image and identifies transmitted information from the extrapolated proper signals.

20. The apparatus according to claim 19, wherein the received signal image generation means includes a coherent light source to generate the received signal image, and the spatial frequency filtering means comprises a first lens that Fourier-transforms the received signal image from the received signal image generation means, a matched filter that transfers an image having the received signal image Fourier-transformed and conjugated onto a translucent material, and a second lens that Fourier-transforms a superposed image obtained by the received signal image Fourier-transformed by the first lens being passed through the matched filter to obtain a correlation projection image that is the superposed image Fourier-transformed by the second lens.

21. The apparatus according to claim 19, wherein the received signal image generation means includes an incoherent light source to generate the received signal image, and the spatial frequency filtering means projects the received signal image onto a correlation filter having the received signal pattern image recorded on a translucent material to obtain the correlation projection image.

22. The apparatus according to claim 19, wherein the received signal image generation means comprises a serial/parallel conversion section that parallelizes bits of received serial signals and outputs the signals as parallel signals, and a display section that displays two-dimensional images based on the parallel signals from the serial/parallel conversion section.

23. The apparatus according to claim 20, wherein the received signal image generation means comprises a serial/parallel conversion section that parallelizes bits of received serial signals and outputs the signals as parallel signals, and a display section that displays two-dimensional images based on the parallel signals from the serial/parallel conversion section.

24. The apparatus according to claim 21, wherein the received signal image generation means comprises a serial/parallel conversion section that parallelizes bits of received serial signals and outputs the signals as parallel signals, and a display section that displays two-dimensional images based on the parallel signals from the serial/parallel conversion section.

25. The apparatus according to claim 22, wherein the serial/parallel conversion section branches the digital signal into optical fibers corresponding in number to the multiple bits and adjusts transmission delay time for each optical fiber to thereby parallelize the digital signal transmitted as a serial optical signal.

26. The apparatus according to claim 23, wherein the serial/parallel conversion section branches the digital signal into optical fibers corresponding in number to the multiple bits and adjusts transmission delay time for each optical fiber to thereby parallelize the digital signal transmitted as a serial optical signal.

27. The apparatus according to claim 24, wherein the serial/parallel conversion section branches the digital signal into optical fibers corresponding in number to the multiple bits and adjusts transmission delay time for each optical fiber to thereby parallelize the digital signal transmitted as a serial optical signal.

28. The apparatus according to claim 19, wherein the received signal image generation means generates the received signal image as a two-dimensional image using a different graphical form to correspond to each bit position in the received signal, and the spatial frequency filtering means generates the received signal pattern image applying the different graphical form to each bit string to improve image matching accuracy.

29. The apparatus according to claim 20, wherein the received signal image generation means generates the received signal image as a two-dimensional image using a different graphical form to correspond to each bit position in the received signal, and the spatial frequency filtering means generates the received signal pattern image applying the different graphical form to each bit string to improve image matching accuracy.

30. The apparatus according to claim 21, wherein the received signal image generation means generates the received signal image as a two-dimensional image using a different graphical form to correspond to each bit position in the received signal, and the spatial frequency filtering means generates the received signal pattern image applying the different graphical form to each bit string to improve image matching accuracy.

31. The apparatus according to claim 22, wherein the received signal image generation means generates the received signal image as a two-dimensional image using a different graphical form to correspond to each bit position in the received signal, and the spatial frequency filtering means generates the received signal pattern image applying the different graphical form to each bit string to improve image matching accuracy.

32. The apparatus according to claim 23, wherein the received signal image generation means generates the received signal image as a two-dimensional image using a different graphical form to correspond to each bit position in the received signal, and the spatial frequency filtering means generates the received signal pattern image applying the different graphical form to each bit string to improve image matching accuracy.

33. The apparatus according to claim 24, wherein the received signal image generation means generates the received signal image as a two-dimensional image using a different graphical form to correspond to each bit position in the received signal, and the spatial frequency filtering means generates the received signal pattern image applying the different graphical form to each bit string to improve image matching accuracy.

34. The apparatus according to claim 25, wherein the received signal image generation means generates the received signal image as a two-dimensional image using a different graphical form to correspond to each bit position in the received signal, and the spatial frequency filtering means generates the received signal pattern image applying the different graphical form to each bit string to improve image matching accuracy.

35. The apparatus according to claim 26, wherein the received signal image generation means generates the received signal image as a two-dimensional image using a different graphical form to correspond to each bit position in the received signal, and the spatial frequency filtering means generates the received signal pattern image applying the different graphical form to each bit string to improve image matching accuracy.

36. The apparatus according to claim 27, wherein the received signal image generation means generates the received signal image as a two-dimensional image using a different graphical form to correspond to each bit position in the received signal, and the spatial frequency filtering means generates the received signal pattern image applying the different graphical form to each bit string to improve image matching accuracy.

* * * * *

UNITED STATES PATENT AND TRADEMARK OFFICE
CERTIFICATE OF CORRECTION

PATENT NO. : 7,423,793 B2
APPLICATION NO. : 10/684548
DATED : September 9, 2008
INVENTOR(S) : Shikatani It is certified that error appears in the above-identified patent and that said Letters Patent is hereby corrected as shown below:

On the title page, Item (73), the Assignee information is incorrect. Item (73) should read:

-- (73) Assignee: National Institute of Information and Communications Technology, Tokyo (JP) --

Signed and Sealed this

Fourth Day of November, 2008

JON W. DUDAS
*Director of the United States Patent and Trademark Office*